(12) United States Patent
Blades (10) Patent No.: US 9,321,522 B2
(45) Date of Patent: Apr. 26, 2016

(54) PLAIN JOURNAL BEARING (71) Applicant: AIRBUS OPERATIONS LIMITED, Bristol (GB)

(72) Inventor: Paul Blades, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 631 days.

(21) Appl. No.: 13/644,333

(22) Filed: Oct. 4, 2012

(65) Prior Publication Data
US 2013/0104375 A1    May 2, 2013

(30) Foreign Application Priority Data

Oct. 27, 2011 (GB) .................................... 1118548.5

(51) Int. Cl.
*F16C 11/02* (2006.01)
*B64C 9/02* (2006.01)

(52) U.S. Cl.
CPC . *B64C 9/02* (2013.01); *F16C 11/02* (2013.01); *Y02T 50/44* (2013.01); *Y10T 29/49948* (2015.01); *Y10T 403/32909* (2015.01)

(58) Field of Classification Search
CPC ........ B64D 27/00; B64D 27/26; F16C 11/00; F16C 11/061; F16C 11/04; F16C 11/045; Y10T 403/32918; Y10T 403/32926; Y10T 403/32893; Y10T 403/32861; Y10T 403/32909
See application file for complete search history.

(56) References Cited

U.S. PATENT DOCUMENTS

| 5,860,623 | A | * | 1/1999 | Dunstan | B64D 27/18 244/54 |
|---|---|---|---|---|---|
| 5,873,547 | A | * | 2/1999 | Dunstan | B64D 27/18 244/54 |
| 6,330,995 | B1 | * | 12/2001 | Mangeiga | B64D 27/26 244/54 |
| 2004/0216461 | A1 | * | 11/2004 | Wallace | B64D 27/26 60/772 |
| 2005/0269445 | A1 | * | 12/2005 | Chevalier | B64D 27/26 244/54 |
| 2006/0219841 | A1 | * | 10/2006 | Dron | B64D 27/26 244/54 |
| 2010/0032520 | A1 | * | 2/2010 | Mauran | B64C 9/02 244/99.4 |
| 2011/0220762 | A1 | | 9/2011 | Gyuricsko et al. | |
| 2014/0042268 | A1 | * | 2/2014 | Sandy | B64D 27/26 244/54 |

FOREIGN PATENT DOCUMENTS

| EP | 1129942 A2 | 9/2001 |
|---|---|---|
| FR | 2952146 A1 | 5/2011 |

OTHER PUBLICATIONS

Search Report corresponding to GB1118548.5, dated Feb. 21, 2012.

* cited by examiner

*Primary Examiner* — Daniel Wiley
(74) *Attorney, Agent, or Firm* — Hauptman Ham, LLP (57) ABSTRACT

A plain journal bearing couples first and second components. A pin passes through the components. A clamping bush surrounds the pin. A clamping member is mounted on the pin and provides a clamping force to urge the clamping bush into clamping engagement with the first component. During normal operation, when the components rotate relative to each other, the second component and the clamping bush rotate relative to each other about a primary slip path, and the clamping bush remains in clamping engagement with the first component. During degraded operation, when the components rotate relative to each other and the coefficient of friction of the primary slip path has increased to overcome the clamping force, the pin and the clamping bush or the pin and the first component rotate relative to each other about a subsidiary slip path.

13 Claims, 6 Drawing Sheets

PLAIN JOURNAL BEARING

RELATED APPLICATIONS

The present application is based on, and claims priority from, British Application Number 1118548.5, filed Oct. 27, 2011, the disclosure of which is hereby incorporated by reference herein in its entirety.

FIELD OF THE INVENTION

The present invention relates to a plain journal bearing, and a method of enabling relative rotation between a first component and a second component by operation of a plain journal bearing.

BACKGROUND OF THE INVENTION

Traditionally the flight control surfaces of commercial airliners are hinged about rolling element bearings. These bearings provide a low co-efficient of friction, a low and largely predictable wear rate, and in some instances a misalignment capability that allows for a small angular mismatch between the flight control and the wing attachment.

Such bearings can be considerably larger in diameter than the attachment pin that joins the flight control surface to the wing. The large diameter of the bearing results in a considerably larger hole in the flight control or wing structure than the attachment pin necessitates. This large hole in the structure often has a significant weight penalty as a result of the fatigue performance associated with the interruption in stresses flowing around the hole.

A further problem with the large diameter of such bearings is that they make it difficult to position the hinge line close to the outer surface of the wing without creating a protrusion which would require aerodynamic shrouding. Positioning the hinge line close to the outer surface of the wing is desirable because it maximises the distance between the hinge line and the line of action of the actuator jack which rotates the control surface. This enables the size and weight of the actuator to be minimised, reducing or even eliminating the need for fairings to cover the actuator should its size result in portions of its body being unshrouded by the wing.

A plain bearing, or friction bearing, works by operation of a low friction slip path between two parts, enabling them to move relative to each other without requiring any rolling elements (such as ball-bearings) between them. A plain journal bearing is a type of plain bearing which enables the parts to rotate relative to each other. Plain journal bearings have not traditionally been used for flight control surfaces since they do not have the necessary redundancy. In other words, if the low friction slip path becomes jammed, then there is no secondary slip path which will enable the bearing to continue to operate.

SUMMARY OF THE INVENTION

A first aspect of the invention provides a plain journal bearing according to claim 1 or claim 2. A further aspect of the invention provides a method according to claim 14 or claim 15.

The provision of a subsidiary slip path makes the plain journal bearing suitable for use with a flight control surface or any other component requiring a subsidiary slip path.

The subsidiary slip path may operate as in claims 1 and 14 to enable the pin and the clamping bush to rotate relative to each other about the subsidiary slip path, so that when this subsidiary slip path is active, the first component and the pin can rotate together relative to the clamping bush and the second component. Alternatively, the subsidiary slip path may operate as in claims 2 and 15 to enable the pin and the first component to rotate relative to each other about the subsidiary slip path, so that when this subsidiary slip path is active, the first component can rotate relative to the pin, the clamping bush and the second component. Alternatively, the bearing arrangement may provide two subsidiary slip paths as in claim 3, and the two subsidiary slip paths may exchange depending on the prevailing conditions.

Optionally the second component may comprise a fixed bush so that the primary slip path is between the clamping bush and the fixed bush.

The clamping bush typically comprises a low friction material on its outer diameter. The low friction material of the clamping bush may be provided by a coating which is adhered to the clamping bush. The coating may be a non metallic coating, for example a PTFE or polymer based coating, or a metallic coating, for example a copper or molybdenum based coating, or any other low friction coating. The low friction coating may be applied to the clamping bush and then machined to provide a contact surface. Alternatively, the body of the clamping bush may be made of a low friction material which does not require coating.

The body of the pin and/or the body of the clamping bush may be made of a low friction material which provides a relatively low coefficient of friction and thus enables the subsidiary slip path(s) to operate without requiring an additional layer of low friction material. Alternatively the first and/or second subsidiary slip path may comprise a layer of low friction material. The low friction material has a lower coefficient of friction than the pin and/or the clamping bush, so it lowers the coefficient of friction of the subsidiary slip path. The low friction material may be non-metallic (for example a PTFE or polymer based material); metallic (for example a copper or molybdenum based material); or any other low friction material. This layer may be provided as a separate and independent layer (for instance a layer of grease) or more preferably as a coating. The coating may be adhered and then machined to provide a contact surface. The coating may be adhered to an inner diameter of the clamping bush, or more preferably it is adhered to an outer diameter of the pin (an outer diameter being easier to coat than an inner diameter).

Optionally a layer of low friction material may be provided between the clamping bush and the first component and/or between the clamping bush and the clamping member. This layer may be provided as a separate layer (for instance a layer of grease) or more preferably as a coating. The coating may be adhered to one or both end faces of the clamping bush. The low friction material may be non-metallic (for example a PTFE or polymer based material); metallic (for example a copper or molybdenum based material); or any other low friction material.

The bearing may be used to mount any two components to each other in a joint requiring a redundant slip path. Preferably the bearing is installed on an aircraft. For instance the first component may be a flight control element (such as an aileron, spoiler, flap or rudder) and the second component may be a main wing element. Alternatively, the bearing may be used anywhere else on an aircraft where a hinge with a redundant slip path is required, for example in a landing gear door assembly.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
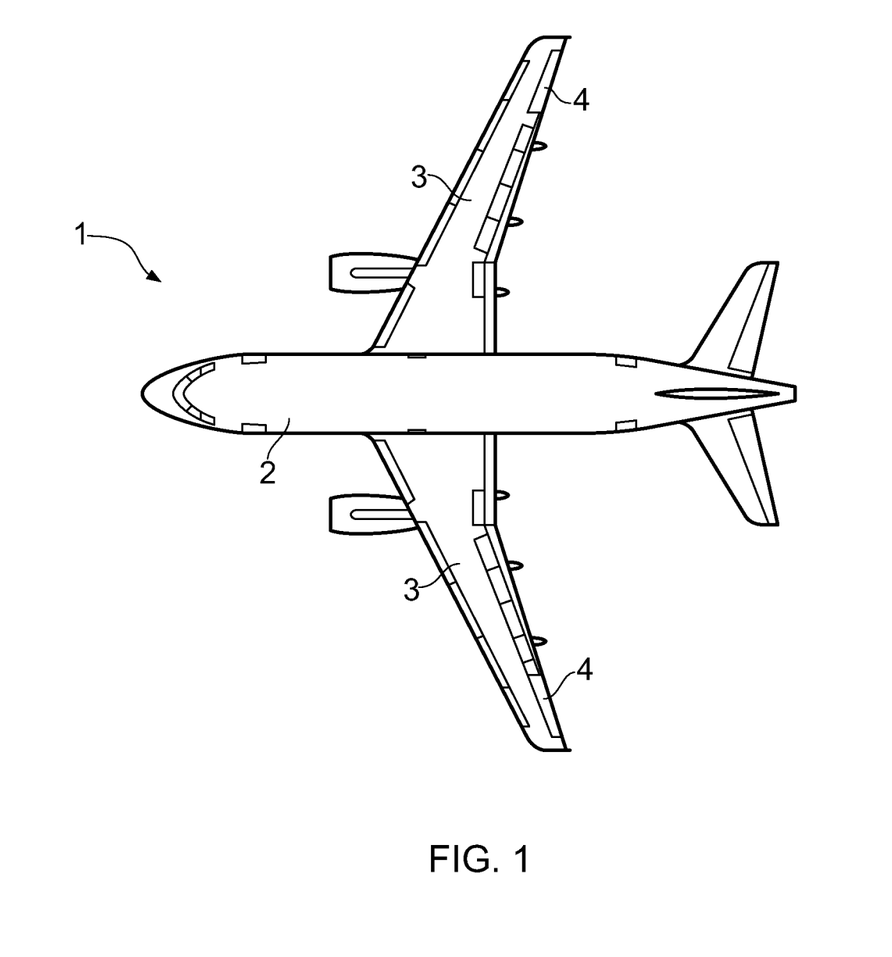
FIG. 1 is a plan view of an aircraft.

FIG. 1 is a plan view of an aircraft 1 having a fuselage 2 and wings 3. Each wing 3 comprises a wing box and a plurality of control surfaces coupled to the wing box. These control surfaces include ailerons 4 at the outboard tip of each wing 3 which are used to control roll of the aircraft.

Figure 2:
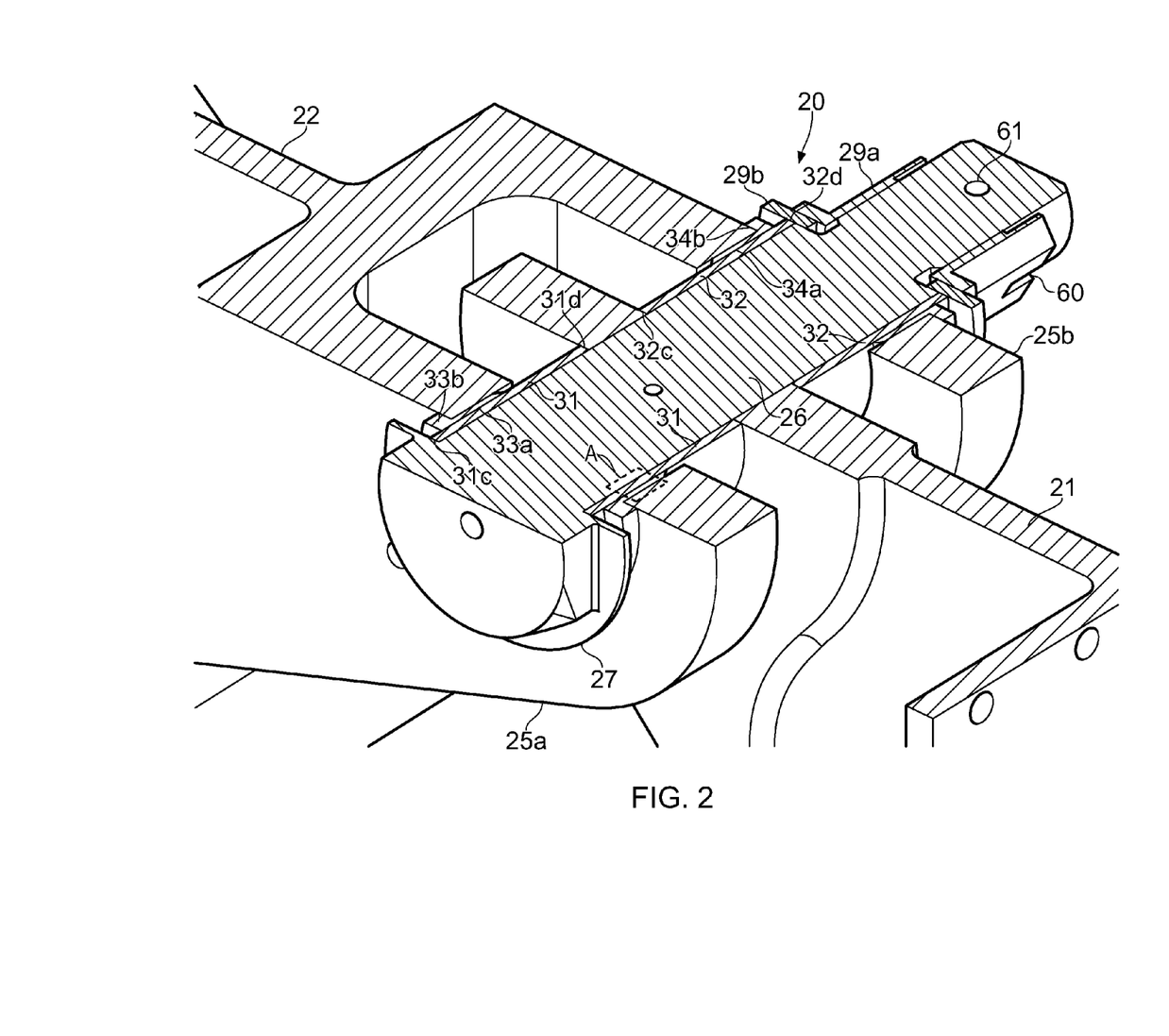
FIG. 2 is a perspective view, partly in section, of an aileron hinge bearing.

Referring to FIG. 2, the wing box has a rib 22 extending aft from the rear spar of the wing box, and the aileron 4 has an arm 21 extending forward. FIG. 2 illustrates a plain journal bearing 20 which couples the aileron arm 21 to the rib 22.

The rib 22 has a pair of lugs 25a, 25b which form a clevis. The aileron arm 21 is positioned between the lugs 25a, 25b where a pin passes through them. The bearing 20 acts as a hinge, allowing the aileron arm 21 to rotate relative to the rib 22 about the longitudinal axis of the pin.

The pin comprises a shaft 26, an end cap 27 located at one end of the pin, and a narrow threaded portion 28 located at a second opposite end of the pin for receiving a clamping nut 29a and a washer 29b.

The nut 29a has internal threads (not shown) which interact with threads (not shown) on the narrow portion 28 of the pin so that the nut 29a can be screwed onto the pin and tightened against the washer 29b.

The shaft 26 has an outer surface with a circular cross section, onto which first and second cylindrical clamping bushes 31, 32 are placed. Also, fixed bushes are fitted within the lugs 25a, 25b. Each fixed bush comprises a cylindrical portion 33a, 34a which is seated within the lug and a flange 33b, 34b which engages an outer side of the lug. The fixed bushes may be freeze-fitted into the lugs to prevent them from spinning within the lugs. Alternatively the cylindrical portions 33a, 34a of the fixed bushes may be inserted as a heavy interference fit to prevent them from spinning within the lugs.

Figure 3:
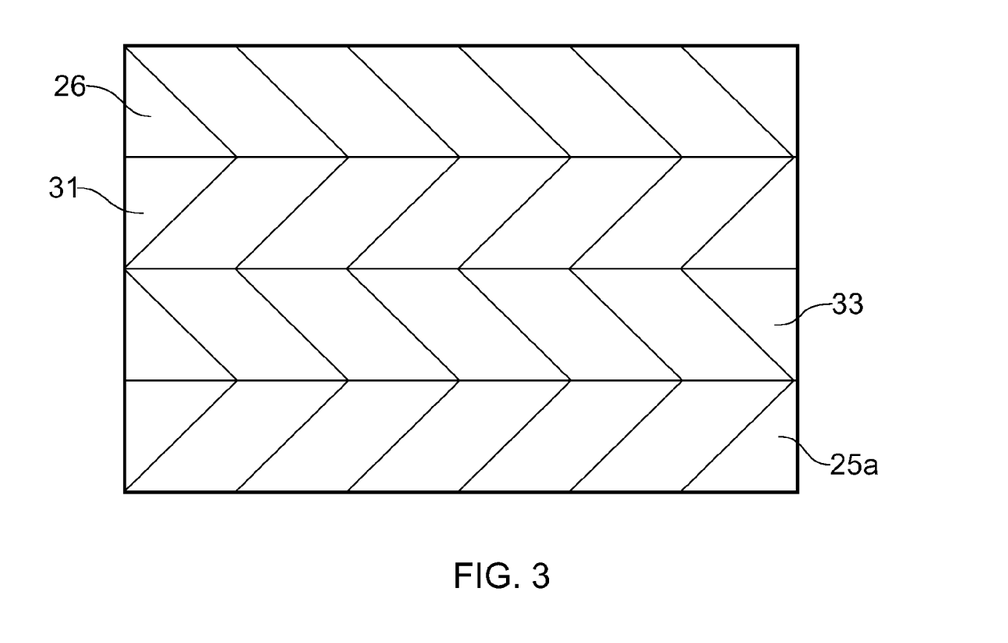
FIG. 3 is an enlarged view of a part A according to a first embodiment.

FIG. 3 is an enlarged view of a small area A in FIG. 2 according to a first embodiment of the invention. In this example the shaft 26 and clamping bush 31 are formed from low friction materials which do not require low friction coatings. For example the shaft 26 may be made from corrosion-resistant steel and the clamping bush 31 may be made from Aluminium bronze.

Figure 4:
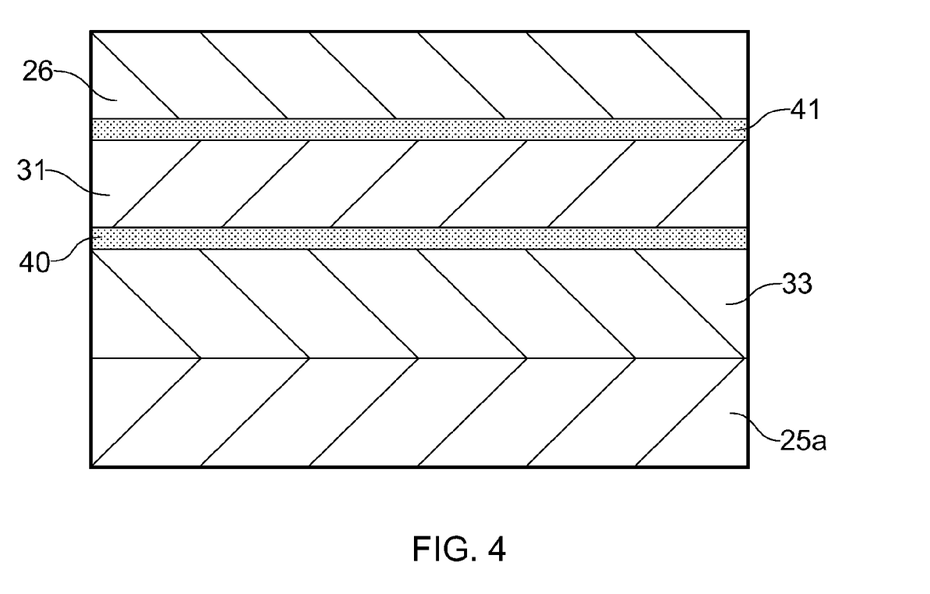
FIG. 4 is an enlarged view of a part A according to a second embodiment.

FIG. 4 is an enlarged view of the area A in FIG. 2 according to a second embodiment of the invention. In this example a low friction coating 40 is adhered to the outer diameter of the shaft 26, and similarly a low friction coating 41 is adhered to the outer diameter of the clamping bush 31. Alternatively the coating 41 may be adhered to the inner diameter of the clamping bush 31 instead of being adhered to the shaft 26 of the pin. The other clamping bush 32 in this embodiment is also provided with a similar low friction coating on its outer diameter (and optionally also its inner diameter).

The coatings 40, 41 are formed from a material with a lower coefficient of friction than the pin, the clamping bush, and the fixed bush. Examples of suitable low friction materials are PTFE or other polymer based materials; molybednum disulphide; Zincnickel, Cadmium, or chrome. The coatings may be applied as a paste and then cured and machined; sprayed on with an evaporating carrier; or applied by magnetron sputtering, electrolysis or vapour deposition.

Preferably the coatings 40, 41 are applied to the pin 23 and clamping bush 31 and then machined to provide accurate contact surfaces.

The use of low friction coatings 40, 41 as in FIG. 4 keeps wear rates low, minimises reaction forces, and resists Galvanic corrosion compared with the uncoated embodiment of FIG. 3.

In the embodiment of FIG. 4 a wider range of materials is possible for the shaft 26 and clamping bush 31. For example they may be made of steel and Aluminium bronze respectively (as in FIG. 3). Alternatively the clamping bush 31 may be made of corrosion-resistant steel as well as the shaft 26.

Returning to FIG. 2—the first clamping bush 31 has outer and inner end faces 31c, 31d which engage the end cap 27 and the aileron arm 21 respectively. The second clamping bush 32 has inner and outer end faces 32c, 32d which engage the aileron arm 21 and the clamping nut washer 29b respectively. The clamping nut 29a is screwed onto the end portion 28 of the pin and tightened to place the pin in tension and apply a clamping force which urges the end faces of the clamping bushes 31, 32 into clamping engagement with the aileron arm 21 and with the end cap 27.

The clamping nut 29a has four slots 60 rounds its periphery, one of which is shown in FIG. 2. The pin has a hole 61 also shown in FIG. 2. The nut is screwed onto the pin until two of the slots 60a are lined up with the hole 61, and a split pin (not shown) is passed through the slots 60a and hole 61, locking the nut in place.

The primary slip path of the bearing 20 is between the inner surfaces of the fixed bushes 33a, 34a and the outer surfaces of the clamping bushes 31, 32 (which may optionally be coated as in FIG. 4). During normal operation of the bearing, this slip path operates so that when the aileron arm 21 rotates relative to the rib 22, the clamping bushes 31, 32 rotate with the aileron arm 21.

The bearing 20 is additionally provided with two subsidiary redundant slip paths which operate in the event that the primary slip path becomes jammed to the extent that it overcomes the clamping forces applied by the clamping bushes 31, 32.

Figure 5:
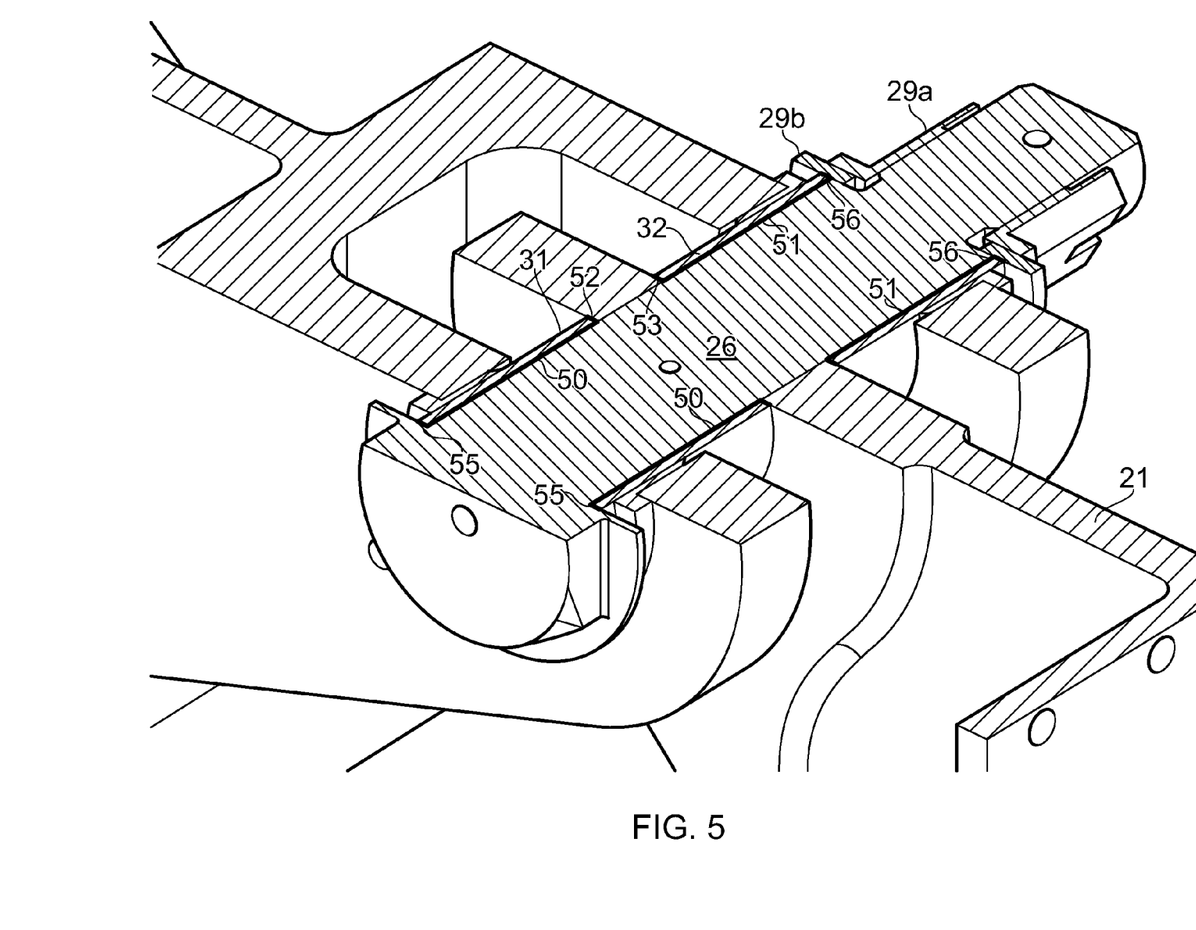
FIG. 5 is a perspective view, partly in section, of the aileron hinge bearing in which a first subsidiary slip path is highlighted.

The first subsidiary slip path is shown as a dark line in FIG. 5. It comprises the interfaces 50, 51 between the outer surface of the shaft 26 (which may optionally be coated as in FIG. 4) and the inner surfaces of the clamping bushes 31, 32; the freed clamping interface 55 between the end cap 27 and the outer end of the clamping bush 31; the freed clamping interface 56 between the outer end of the clamping bush 32 and the washer 29b; and the freed clamping interfaces 52, 53 between the aileron arm 21 and the inner ends of the clamping bushes 31, 32. When this first subsidiary slip path is active, the pin 26, nut 29a, washer 29b and aileron arm 21 rotate together relative to the jammed clamping bushes 31, 32.

Figure 6:
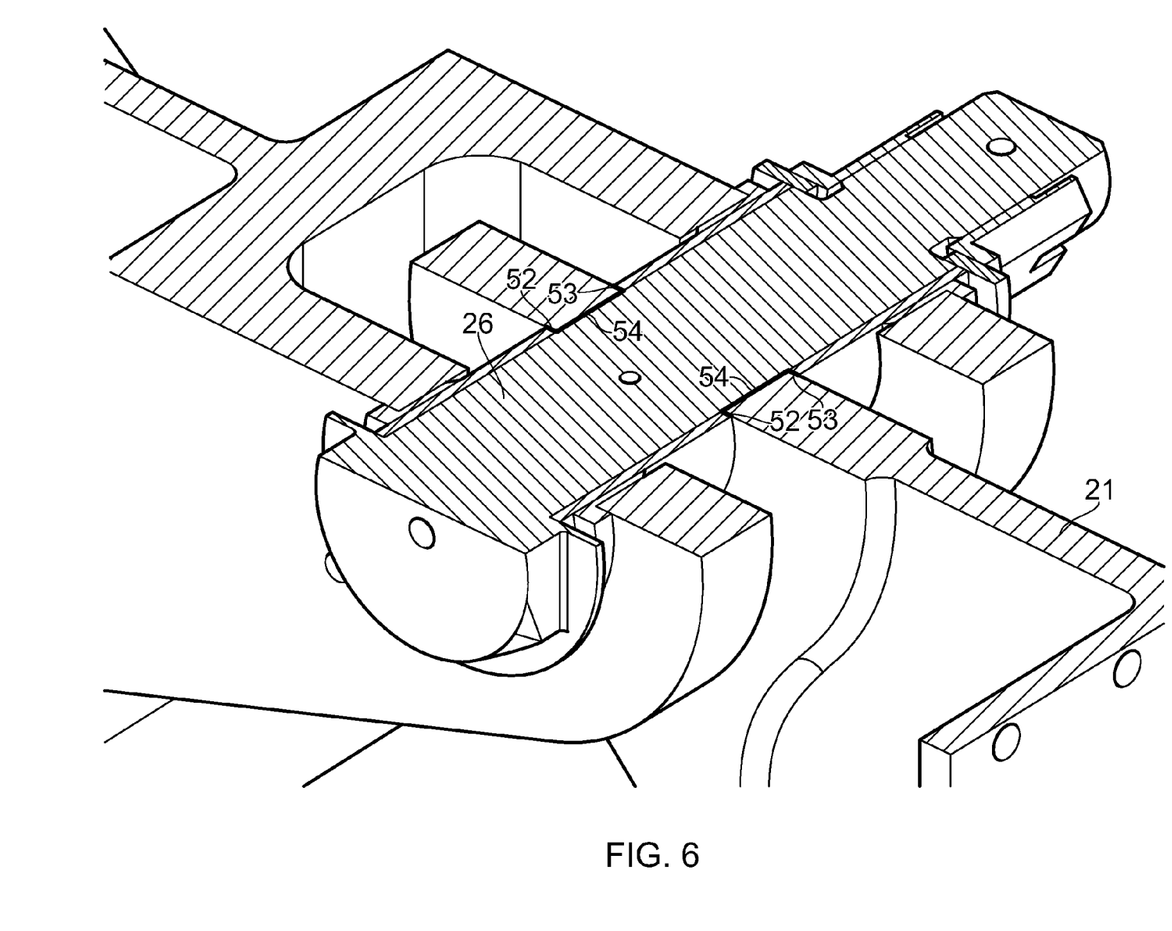
FIG. 6 is a perspective view, partly in section, of the aileron hinge bearing in which a second subsidiary slip path is highlighted.

A second subsidiary slip path is shown as a dark line in FIG. 6. It comprises the interface 54 between the outer surface of the shaft 26 (which may optionally be coated as in FIG. 4) and the aileron arm 21, and the freed clamping interfaces 52, 53 between the aileron arm 21 and the inner ends of the clamping bushes 31, 32. When this second subsidiary slip path is active, the aileron arm 21 rotates relative to the pin 26.

The subsidiary slip paths shown in FIGS. 5 and 6 operate when the coefficient of friction of the primary slip path has become sufficiently high to overcome the clamping forces and allow the aileron arm 21 to "break free" and begin to rotate relative to the clamping bushes 31, 32.

Either one or both of the subsidiary slip paths may operate, depending on their relative coefficients of friction and the operating conditions which are prevailing. Once at least one of the subsidiary slip paths has become active, the bearing may continue to function with only the subsidiary slip path(s) being active, or it may alternate between the primary slip path and the subsidiary slip paths.

The first subsidiary slip path of FIG. 5 is more preferable than the second subsidiary slip path of FIG. 6, because wear forces will be spread over a wider area. Therefore to promote operation of this subsidiary slip path the end faces 31c, 31d, 32c, 32d of the clamping bushes may be coated with a layer of low friction material, and/or the layer of low friction material on the pin may be removed along the interface 54 between the pin and the aileron arm 21. As a result the first subsidiary slip path will have a lower coefficient of friction than the second subsidiary slip path.

Alternatively, if for some reason the second subsidiary slip path of FIG. 6 is preferred then the inner end faces 31d, 32c of the clamping bushes may be coated with a layer of low friction material, but not their outer end faces 31c, 32d. Also, the layer of low friction material on the pin may be removed along the interface 51 between the pin and the clamping bush.

By providing a plain journal bearing having at least one (and preferably two) redundant subsidiary slip paths, it is possible to eliminate the large and heavy rolling element or lined spherical bearings conventionally used to mount an aileron to a main wing structure, significantly reducing the size and weight of the joint. The compact joint also reduces the size of the holes required in the aileron arm 21 and the lugs 25a, 25b and the required reinforcement around each hole, reducing the weight and dimensions of the aileron arm 21 and the lugs 25a, 25b.

The position of the aileron 4 is controlled by an actuator (not shown) which acts on the aileron, causing it to pivot about the axis of the pin. By increasing the distance between the actuator and the axis of the joint (the axis of the pin), the lever arm may be maximised to provide mechanical advantage to the actuator. However, the distance between the actuator and the axis of the joint is limited by the need to package the mechanism within the skins of the wing 3 or to provide aerodynamic fairings to accommodate the actuator. By reducing the dimensions of the bearing, it is possible to move the axis of the joint closer to the wing skin. This allows a reduction in the size and weight of the actuator required and reduces or eliminates the need for aerodynamic fairings to house parts of the system protruding from the wing skin.

In the case of FIG. 4 where low friction coatings 40, 41 are provided, then these coatings 40, 41 may provide a degree of compliance which will allow for a small angular misalignment in the joint. Such misalignments would normally be catered for by a rolling element or lined spherical bearing with some misalignment capability. Additionally it may be necessary to provide a degree of flexibility in either the main wing element 22 or the aileron attachment structure 21 to allow for misalignment.

Although the invention has been described above with reference to one or more preferred embodiments, it will be appreciated that various changes or modifications may be made without departing from the scope of the invention as defined in the appended claims.

The invention claimed is:

1. A plain journal bearing coupling a first component to a second component, the bearing comprising:
   a pin which passes through the first component and the second component;
   a clamping bush which surrounds the pin and has a cylindrical inner surface, a cylindrical outer surface, and an end face; and
   a clamping member which is mounted on the pin and provides a clamping force between the end face of the clamping bush and the first component,
   wherein the bearing has a primary slip path between the outer surface of the clamping bush and the second component, the primary slip path having an initial coefficient of friction sufficiently low that, when the first and second component rotate relative to each other, the second component and the clamping bush rotate relative to each other about the primary slip path and the clamping bush remains in clamping engagement with the first component; and
   wherein the pin has a cylindrical outer surface which provides a subsidiary slip path which is arranged to operate when the coefficient of friction of the primary slip path has been sufficiently increased due to use that a friction force between the clamping bush and the second component overcomes the clamping force, whereby when the first and second component rotate relative to each other, the pin and the clamping bush rotate relative to each other about the subsidiary slip path.

2. The bearing of claim 1 wherein the cylindrical outer surface of the in provides:
   a first subsidiary slip path which is arranged to operate when the coefficient of friction of the primary slip path has been sufficiently increased due to use that a friction force between the clamping bush and the second component exceeds the clamping force, whereby when the first and second component rotate relative to each other, the pin and the clamping bush can rotate relative to each other about the first subsidiary slip path; and
   a second subsidiary slip path which is arranged to operate when the coefficient of friction of the primary slip path has been sufficiently increased due to use that a friction force between the clamping bush and the second component overcomes the clamping force, whereby when the first and second component rotate relative to each other, the pin and the first component can rotate relative to each other about the second subsidiary slip path.

3. The bearing of claim 2 wherein the first subsidiary slip path has a lower coefficient of friction than the second subsidiary slip path.

4. The bearing of claim 1 wherein the first and/or second subsidiary slip path comprises a layer of low coefficient of friction material.

5. The bearing of claim 4 wherein the layer of low coefficient of friction material comprises a coating of low friction material which is adhered to an inner diameter of the clamping pin or an outer diameter of the pin.

6. The bearing of claim 1 wherein a layer of low coefficient of friction material is provided between the clamping bush and the first component.

7. The bearing of claim 6 wherein the layer of low coefficient of friction material comprises a coating of low friction material which is adhered to the end face of the clamping bush.

8. The bearing of claim 1 wherein a layer of low coefficient of friction material is provided between the clamping bush and the clamping member.

9. The bearing of claim 1 wherein the bearing is installed on an aircraft.

10. The bearing of claim 1 wherein the first component is a flight control element and the second component is a main wing element.

11. The bearing of claim 1 wherein the clamping member comprises a threaded nut which is screwed onto the pin.

12. A plain journal bearing coupling a first component to a second component, the bearing comprising:
- a pin which passes through the first component and the second component;
- a clamping bush which surrounds the pin and has a cylindrical inner surface, a cylindrical outer surface, and an end face; and
- a clamping member which is mounted on the pin and provides a clamping force between the end face of the clamping bush and the first component,
- wherein the bearing has a primary slip path between the outer surface of the clamping bush and the second component, the primary slip path having an initial coefficient of friction sufficiently low that, when the first and second component rotate relative to each other, the second component and the clamping bush rotate relative to each other about the primary slip path and the clamping bush remains in clamping engagement with the first component; and
- wherein the pin has a cylindrical outer surface which provides a subsidiary slip path which is arranged to operate when the coefficient of friction of the primary slip path has been sufficiently increased due to use that a friction force between the clamping bush and the second component overcomes the clamping force, whereby when the first and second component rotate relative to each other, the pin and the first component rotate relative to each other about the subsidiary slip path.

13. An installation on an aircraft, the installation comprising a main wing element; a flight control element; and a bearing according to claim 1 coupling the main wing element to the flight control element.

* * * * *